United States Patent Office 2,994,651
Patented Aug. 1, 1961

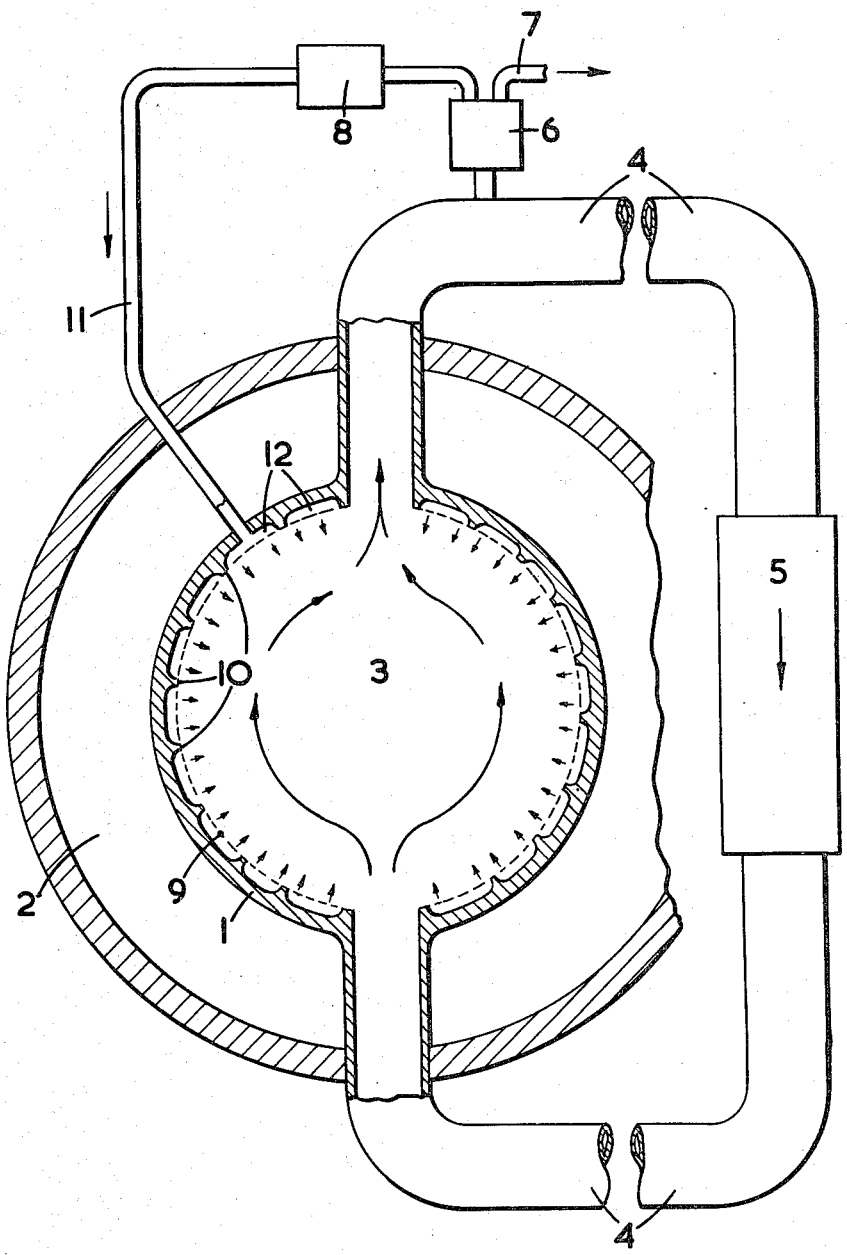

2,994,651
NUCLEAR REACTORS
Robert Spence, Harwell, England, assignor to the United Kingdom Atomic Energy Authority of Patents Branch, London, England
Filed May 10, 1957, Ser. No. 658,310
Claims priority, application Great Britain May 15, 1956
9 Claims. (Cl. 204—154.2)

This invention relates to nuclear reactors and is concerned with such reactors of the kind in which a fluid carrying fissile material is circulated through a core vessel and through an external circuit for the purpose of removing heat generated by fission in the core vessel.

A problem in the design of such a reactor is to provide a core vessel which will withstand not only the ordinary chemical corrosive action of the fluid but that of the fission fragments. The problem becomes even more difficult when it is required to provide a core vessel which is substantially transparent to neutrons such that neutrons radiated from the core can be usefully employed in, for example, a surrounding blanket of fertile material, since the choice of a suitable material for the vessel is then very limited.

One of the most suitable materials for the latter requirement is zirconium and to a lesser extent stainless steel but both are liable to excessive corrosion when bombarded by fission products.

According to the present invention the core vessel of a reactor of the kind set forth is provided with a porous or perforated inner lining and means are provided for feeding a substantially non-corrosive fluid to the lining, said non-corrosive fluid being extracted from the working fluid in the external circuit. The arrangement is such that there is an inwardly directed stream of non-corrosive fluid emanating from the lining and continuously tending to keep fissioning atoms away from the inner surface of the core vessel.

In one form of the invention, the porous or perforated inner lining is spaced from the inner surface of the core vessel and means are provided for feeding the non-corrosive fluid to the space between the vessel and the lining.

In another form of the invention not shown in the drawing, the core vessel is provided with a porous lining in intimate contact with the inner surface of the vessel and means are provided for feeding the non-corrosive fluid to said porous lining in such a way that there is an inwardly directed stream of non-corrosive fluid emanating from the lining. Such an arrangement may be achieved for example by feeding said non-corrosive fluid to channels in the wall of the core vessel, said channels being suitably spaced so as to give a uniform distribution of the non-corrosive fluid.

A type of reactor to which the invention is particularly applicable is the homogeneous aqueous reactor in which the working fluid is an aqueous solution of a salt of a fissile metal.

In the operation of a reactor of this type a substantial quantity of the water (usually heavy water) is decomposed into hydrogen (or deuterium) and oxygen and although methods are available for reducing the extent of this decomposition, a considerable amount of gas is nevertheless evolved and, in fact, can be put to good use as a means of sweeping out of the system those fission products which are in the gaseous state.

In order to maintain a closed cycle, the hydrogen (or deuterium) and oxygen may, after separation from the fission product gases, be re-combined, condensed and returned to the core vessel. As stated above the contents of the core vessel are circulated from the vessel through a heat exchanger and returned to the core vessel in a closed cycle and the condensate would normally be returned to the vessel with the main fluid stream.

A feature of the present invention resides in a method of operating an aqueous homogeneous nuclear reactor wherein the deuterium and oxygen produced by decomposition of the heavy water are, after separation from the fission products, re-combined, condensed, and returned to the core vessel through a porous or perforated inner lining such that there is an inwardly directed stream of heavy water emanating from the lining.

The inner lining of the invention may be very thin and may therefore be chosen more from the aspect of its corrosion resistance than its neutron transparency. One suitable material is titanium either in porous sintered form or in perforated non-porous sheet form.

Another suitable material, which is particularly adapted to the form of the invention in which the lining is in intimate contact with the inner surface of the core vessel, is a ceramic material which may be applied to the inner surface of the core vessel by (for example) a flame spraying technique, so as to form a strongly adherent porous ceramic layer thereon. Suitable ceramic materials include oxides such as zirconia or alumina and carbides such as silicon carbide.

The nature of the invention will be more readily understood if reference is made to the accompanying drawing which is a diagrammatic cross-section of a reactor embodying one form of the invention.

In the drawing the core vessel 1 consists of a zirconium shell about 1 cm. thick surrounded by a pressurised blanket 2 of breading material. Within the core vessel 1 is the aqueous solution 3 of fissionable material which is arranged to circulate around a closed circuit comprising a duct 4 and a heat exchanger 5. At a point in the duct 4 a gas separator 6 is provided to remove the deuterium and oxygen together with gaseous fission products which have been swept out of the core. The separator 6 also comprises means for separating the fission product gases from the deuterium and oxygen. The former are led off from the system through a duct and the latter are passed to re-combining and condensing means 8.

The pressure vessel 1 is provided with an inner lining 9 consisting of a thin sheet of sintered titanium supported a short distance from the inner surface of the pressure vessel by webs 10. The condensate from means 8 is fed through a pipe 11 to the space 12 between the inner lining 9 and the vessel 1 in such a manner as to ensure substantially even distribution of the condensate. For example the pipe 11 may feed into a circular manifold (not shown) from which a multiplicity of radial branches may extend through the wall of the vessel 1 to ensure even distribution.

In operation the condensate flows radially inwards through the inner lining 9 over substantially the whole of the inner surface as indicated by the small arrows, thus tending to flush fissioning atoms produced within the core towards the centre of the pressure vessel into the main circulating stream which carries them out of the core into the duct 4. Since the duct 4 is not usually required to be transparent to neutrons it can be constructed of less corrodible or heavier material than the vessel 1.

I claim:
1. In a nuclear reactor having a core vessel for containing fissile material and having a peripheral wall with an inner surface, and means for circulating through the core vessel a working fluid subject to decomposition to produce deuterium and oxygen, apparatus for preventing corrosion of the inner surface of the peripheral wall of the core vessel by the bombardment of fission fragments comprising means communicating with the circulating means for withdrawing deuterium and oxygen swept out of the core vessel with gaseous fission products, means for separating the deuterium and oxygen from said gaseous fission products, means for combining and condensing the deuterium and oxygen as non-corrosive heavy water, a liquid permeable peripheral liner mounted in the core vessel adjacent said inner surface and disposed to be in direct contact with the fission fragments, and means for feeding the non-corrosive heavy water through said liner to emanate as a stream directed inwardly of the core vessel.

2. Apparatus according to claim 1 wherein the liner is spaced from said inner surface and the feeding means supplies the non-corrosive heavy water to the space between the liner and the inner surface.

3. Apparatus according to claim 1 wherein the liner is in intimate contact with said inner surface of the peripheral wall of the core vessel and the feeding means includes means in the wall for supplying the non-corrosive heavy water to the liner.

4. Apparatus according to claim 1 wherein the liner is made of titanium.

5. Apparatus according to claim 1 wherein the liner is made of a ceramic material from the group consisting of zirconia, alumina, and silicon carbide.

6. A method of preventing corrosion of the inner surface of the peripheral wall of the core vessel of a nuclear reactor by the bombardment of fission fragments and wherein a working fluid subject to decomposition to produce deuterium and oxygen is circulated through the core vessel, comprising withdrawing from the working fluid deuterium and oxygen with gaseous fission products swept out of the core vessel, separating the deuterium and oxygen from the gaseous fission products, combining and condensing the deuterium and oxygen as non-corrosive heavy water, and feeding the non-corrosive heavy water through a liquid permeable peripheral liner mounted in the core vessel adjacent the inner surface of the peripheral wall thereof and disposed to be in direct contact with the fission fragments such that the non-corrosive heavy water emanates as a stream directed inwardly of the core vessel.

7. A method according to claim 6 wherein the liner is spaced from said inner surface of the peripheral wall and the heavy water is fed to the space between the liner and said inner surface.

8. A method according to claim 6 wherein the liner is in intimate contact with said inner surface of the peripheral wall and the heavy water is fed through the wall to the liner.

9. A method of operating a homogeneous aqueous reactor wherein a solution of a salt of a fissile metal in heavy water is circulated through a core vessel and through an external circuit for the purpose of removing heat generated by fission in the core vessel, and deuterium and oxygen are produced by decomposition of the heavy water by radiation within the core vessel, comprising separating said deuterium and oxygen from fission products, recombining said deuterium and oxygen to form heavy water, condensing said heavy water and returning it to said core vessel through a water-permeable inner lining mounted in the core vessel such that an inwardly directed stream of heavy water emanates from said lining into the core vessel.

References Cited in the file of this patent

UNITED STATES PATENTS 2,431,632     Brandt _____ Nov. 25, 1947

FOREIGN PATENTS 648,293     Great Britain _____ Jan. 3, 1951

OTHER REFERENCES

Beall et al.: "International Conference on the Peaceful Uses of Atomic Energy," vol. 3, pp. 263–282, August 1955, U.N. publication, N.Y. (Copy in Scientific Library.)

Glasstone et al.: "Principles of Nuclear Reactor Engineering," pp. 504, 505, 514, July 1955, D. Van Nostrand Co., Inc. (Copy in Div. 46.)